United States Patent [19]
Charnley et al.

[11] Patent Number: 5,521,951
[45] Date of Patent: May 28, 1996

[54] REACTOR CORE SHROUD REPAIR WITH TAPERED PINS

[75] Inventors: James E. Charnley, Nevada City; John G. Erbes, Mt. View; Grant C. Jensen, Morgan Hill, all of Calif.

[73] Assignee: General Electric Company, San Jose, Calif.

[21] Appl. No.: 311,300

[22] Filed: Sep. 23, 1994

[51] Int. Cl.⁶ .................................................... G21C 19/00
[52] U.S. Cl. ............................ 376/260; 376/302; 411/60; 29/402.15
[58] Field of Search ....................... 376/260, 285, 376/287, 302, 303, 304, 446; 411/55, 57, 60, 61; 29/402.01, 402.07, 402.08, 402.14, 402.15, 402.16, 402.17, 723, 906; 403/292, 297

[56] References Cited

U.S. PATENT DOCUMENTS

| | | | |
|---|---|---|---|
| 5,392,322 | 2/1995 | Whitling et al. | 376/260 |
| 5,402,570 | 4/1995 | Weems et al. | 29/402.15 |

FOREIGN PATENT DOCUMENTS 0459021  12/1991  European Pat. Off. .

OTHER PUBLICATIONS

GE Proposal No. 894–1D7DM–EK1, Revision 1, Core Spray Line Crack Repair, Dec. 9, 1993.
Shroud Repair, Description of Alternatives, Alan N. Baker, Mar. 1994.

Apr. 22, 1994 letter from Al Kozusko & Thomas Sliva of AEA O'Donnell, Inc. to Victor Bain of General Electric Company with annexed Description, facsimile cover sheet and drawings.

Presentation No. 94–004 dated May 2, 1994, by Welding Services Inc. and Structural Integrity Associates, Inc.

*Primary Examiner*—Daniel D. Wasil
*Attorney, Agent, or Firm*—James E. McGinness

[57] ABSTRACT

A method and an apparatus for repairing a shroud in which one or more shroud girth seam welds have experienced SCC. The method involves the placement of a plurality of brackets around the outer circumference of the shroud at a plurality of azimuthal positions. Each bracket has circular holes for receiving respective tapered pin assemblies. Corresponding circular holes are machined in the shroud wall at positions which will align with the holes in the bracket. Each tapered pin assembly is inserted and then manipulated remotely from outside the shroud. Each tapered pin assembly consists of three types of parts: a threaded tapered pin, a slotted sleeve with a tapered bore, and a threaded nut. When fully installed, the tapered pin is encased by the sleeve. As the tapered pin is tensioned, the sleeve exerts a radially outwardly directed contact pressure on the cylindrical surface of the aligned circular holes respectively formed in the bracket and shroud.

3 Claims, 5 Drawing Sheets

5,521,951

REACTOR CORE SHROUD REPAIR WITH TAPERED PINS

FIELD OF THE INVENTION

This invention relates to maintenance and repair of nuclear reactors. In particular, the invention relates to the repair of the fuel core shroud of a boiling water reactor.

BACKGROUND OF THE INVENTION

A conventional boiling water reactor is shown in FIG. 1. Feedwater is admitted into a reactor pressure vessel (RPV) 10 via a feedwater inlet 12 and a feedwater sparger 14, which is a ring-shaped pipe having suitable apertures for circumferentially distributing the feedwater inside the RPV. A core spray inlet 11 supplies water to a core spray sparger 15 via core spray line 13. The feedwater from feedwater sparger 14 flows downwardly through the downcomer annulus 16, which is an annular region between RPV 10 and core shroud 18. Core shroud 18 is a stainless steel cylinder which surrounds the core 20, which is made up of a plurality of fuel bundle assemblies 22 (only two 2×2 arrays of which are shown in FIG. 1). Each array of fuel bundle assemblies is supported at the top by a top guide 19 and at the bottom by a core plate 21. The core top guide provides lateral support for the top of the fuel assemblies and maintains the correct fuel channel spacing to permit control rod insertion.

The water flows through downcomer annulus 16 to the core lower plenum 24. The water subsequently enters the fuel assemblies 22, wherein a boiling boundary layer is established. A mixture of water and steam enters core upper plenum 26 under shroud head 28. Core upper plenum 26 provides standoff between the steam-water mixture exiting core 20 and entering vertical standpipes 30, which are disposed atop shroud head 28 and in fluid communication with core upper plenum 26.

The steam-water mixture flows through standpipes 30 and enters steam separators 32, which are of the axial-flow centrifugal type. The separated liquid water then mixes with feedwater in the mixing plenum 33, which mixture then returns to the core via the downcomer annulus. The steam passes through steam dryers 34 and enters steam dome 36. The steam is withdrawn from the RPV via steam outlet 38.

The BWR also includes a coolant recirculation system which provides the forced convection flow through the core necessary to attain the required power density. A portion of the water is sucked from the lower end of the downcomer annulus 16 via recirculation water outlet 43 and forced by a centrifugal recirculation pump (not shown) into jet pump assemblies 42 (only one of which is shown) via recirculation water inlets 45. The BWR has two recirculation pumps, each of which provides the driving flow for a plurality of jet pump assemblies. The pressurized driving water is supplied to each jet pump nozzle 44 via an inlet riser 47, an elbow 48 and an inlet mixer 46 in flow sequence. A typical BWR has 16 to 24 inlet mixers. The jet pump assemblies are circumferentially distributed around the core shroud 18.

Stress corrosion cracking (SCC) is a known phenomenon occurring in reactor components, such as structural members, piping, fasteners, and welds, exposed to high-temperature water. The reactor components are subject to a variety of stresses associated with, e.g., differences in thermal expansion, the operating pressure needed for the containment of the reactor cooling water, and other sources such as residual stress from welding, cold working and other inhomogeneous metal treatments. In addition, water chemistry, welding, heat treatment, and radiation can increase the susceptibility of metal in a component to SCC.

Stress corrosion cracking has been found in the shroud girth seam welds or heat affected zones of the core shroud 18. This diminishes the structural integrity of the shroud, which vertically and horizontally supports core top guide 19 and shroud head 28. Thus, there is a need for a method and an apparatus for repairing a shroud which has cracks in or near the shroud girth seam welds.

SUMMARY OF THE INVENTION

The present invention is a method and an apparatus for repairing a shroud in which one or more shroud girth seam welds have experienced SCC. The method involves the placement of a plurality of brackets around the outer circumference of the shroud at a plurality of azimuthal positions, held by shear pins positioned between jet pump assemblies. In the event of multiple cracked shroud girth seam welds, respective pluralities of brackets are installed at respective elevations. The brackets are intended to structurally replace the shroud girth seam welds which are cracked.

The shroud repair brackets in accordance with the invention are designed to support the top guide, the fuel bundle assemblies and the shroud head. The brackets are further designed to withstand the thermal and radiological conditions which the shroud is subjected to. The shroud repair brackets are fastened to the shroud above and below the cracked shroud girth seam weld in a manner which will prevent relative movement across the cracked shroud girth seam welds during all normal and upset conditions. Further, the shroud repair brackets of the present invention are designed and installed such that removal of jet pump inlet mixers and RPV beltline inspection can be performed without removal of the repair brackets.

Each bracket has a plurality of circular holes for receiving a corresponding one of a plurality of tapered pin assemblies. A corresponding plurality of circular holes are machined in the shroud wall at positions which will align with the holes in the bracket. Then the bracket is correctly positioned outside the shroud with the circular holes of the bracket and shroud in alignment. A corresponding tapered pin assembly is blindly installed in each set of aligned holes and then manipulated remotely to fasten the bracket to the shroud.

In accordance with the preferred embodiment of the invention, each tapered pin assembly consists of three types of parts: a threaded tapered pin, a slotted sleeve with a tapered bore, and a threaded nut. The pin has threads and a socket on one end and a precise conical taper on the other end. When fully installed, the tapered pin is encased by the sleeve. The sleeve has a longitudinal slot which allows the sleeve to be flexed radially outward into a configuration having an expanded diameter. In the unflexed state, the slotted sleeve has a precise internal taper which matches the external conical taper of the pin; an external surface having a radius of curvature which is smaller than the radius of curva-ture of the holes in the shroud and in the repair bracket; and a raised annular flange to act as an axial position stop. The annular flange is sized to just pass through the holes in the bracket and shroud when the sleeve is unflexed. The nut is tightened to pull the pin enough to expand the sleeve by an amount sufficient that the annular flange will not pass through the holes. Then the pin is tensioned to produce the desired preload, during which the sleeve expands further. Thereafter the nut is lock welded to the pin.

All steps in the installation of the shroud repair bracket assemblies in accordance with the invention are performed remotely and outside the shroud. In particular, the tapered pin assemblies in accordance with the invention can be entirely installed from outside of the shroud. Prior to insertion, the unflexed sleeve is slid onto the tapered pin and then the nut is threaded onto the pin for a number of turns sufficient to hold the unflexed sleeve in place. This yields a minimum flange diameter which is less than the diameter of the holes in the bracket and shroud wall, allowing the sleeve to pass through the holes. The assembly is then pushed through the aligned holes in the bracket and shroud wall. Once the raised flange of the sleeve clears the inner edge of the hole in the shroud wall, the nut is tightened to pull the tapered pin back until the assembly is seated, i.e., the annular flange on the sleeve latches behind the shroud wall. During this operation, the sleeve is held in place initially by a thrust plate on the tool, reacting between the nut and the sleeve, and then after some expansion, by the raised flange bearing against the inner circumferential surface of the shroud wall. Higher axial load is then applied with a tensioner. This applies a contact pressure between the pins, sleeve, bracket and shroud. The magnitude of this contact pressure can be controlled by varying the tension applied to the pin, by varying the taper angle and by varying the surface conditions.

This shroud repair design is advantageous because it allows fast installation using the minimum number of fasteners. All holes in the shroud are circular cylindrical so that machining the shroud holes is simplified. Because the repair brackets can be installed entirely from the outside of the shroud, it is unnecessary to remove the top guide or the fuel bundle assemblies. The number of brackets needed to accomplish the repair is reduced due to the high load capacity of the shear pins and the splice plates. Also the brackets in accordance with the preferred embodiment of the invention occupy little space in the reactor, which minimizes the impact on other activities inside the reactor. The bracket size and number of pins per bracket can be selected based on the space available and the magnitude of the seismic loads anticipated.

DETAILED DESCRIPTION OF THE PREFERRED EMBODIMENTS

Figure 1:
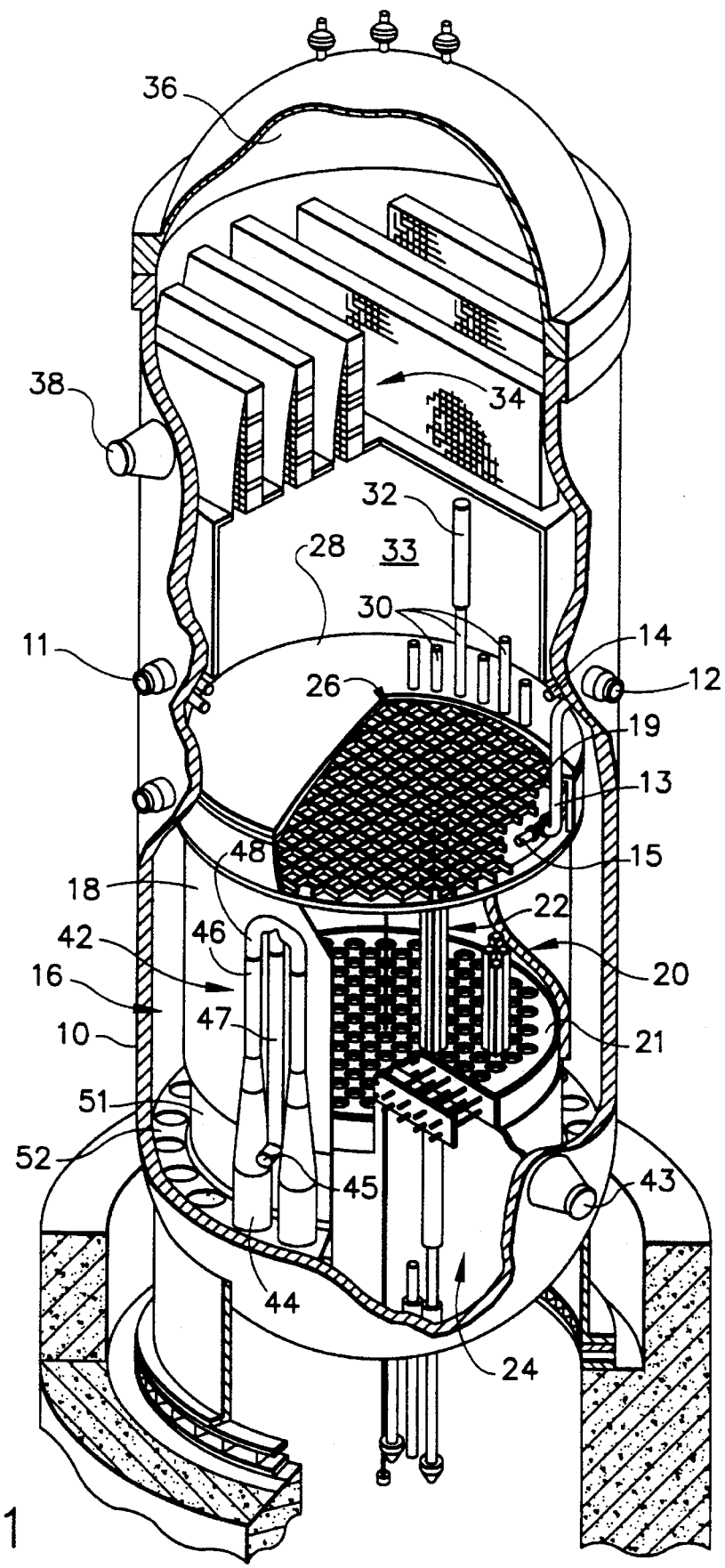
FIG. 1 is a schematic showing a partially cutaway perspective view of a conventional BWR.

The core shroud 18 (see FIG. 2) of a conventional BWR comprises a shroud head flange 18a for supporting the shroud head 28; a circular cylindrical upper shell section 18b welded to shroud head flange 18a; an annular top guide support ring 18c welded to upper shell section 18b; circular cylindrical top and bottom mid-core shell sections 18d and 18e joined at core mid-plane weld 50, with top section 18d welded to top guide support ring 18c and bottom section 18e welded to an annular core plate support ring 18f; and a lower shell section 18g welded to the core plate support ring 18f. The top and bottom sections 18d and 18e of the mid-core shell section are of equal diameter. The diameter of upper shell section 18b is greater than the diameter of mid-core shell sections 18d and 18e, which is in turn greater than the diameter of lower shell section 18g. The entire shroud is supported by shroud support 51, which is welded to the bottom of lower shell section 18f, and by annular shroud support plate 52, which is welded at its inner diameter to shroud support 51 and at its outer diameter to RPV 10. All of the aforementioned welds extend around the entire circumference of the shroud and constitute the shroud girth seam welds.

Stress corrosion cracking has been found in the shroud girth seam welds or heat affected zones thereof. In accordance with the preferred embodiment of the present invention, a plurality of shroud repair bracket assemblies are arranged around the shroud circumference at the elevation of the stress corrosion cracking. The purpose of these bracket assemblies is to structurally replace the shroud girth seam welds which are potentially undermined by cracks. Brackets may be installed only at welds found to have cracking.

Figure 2:
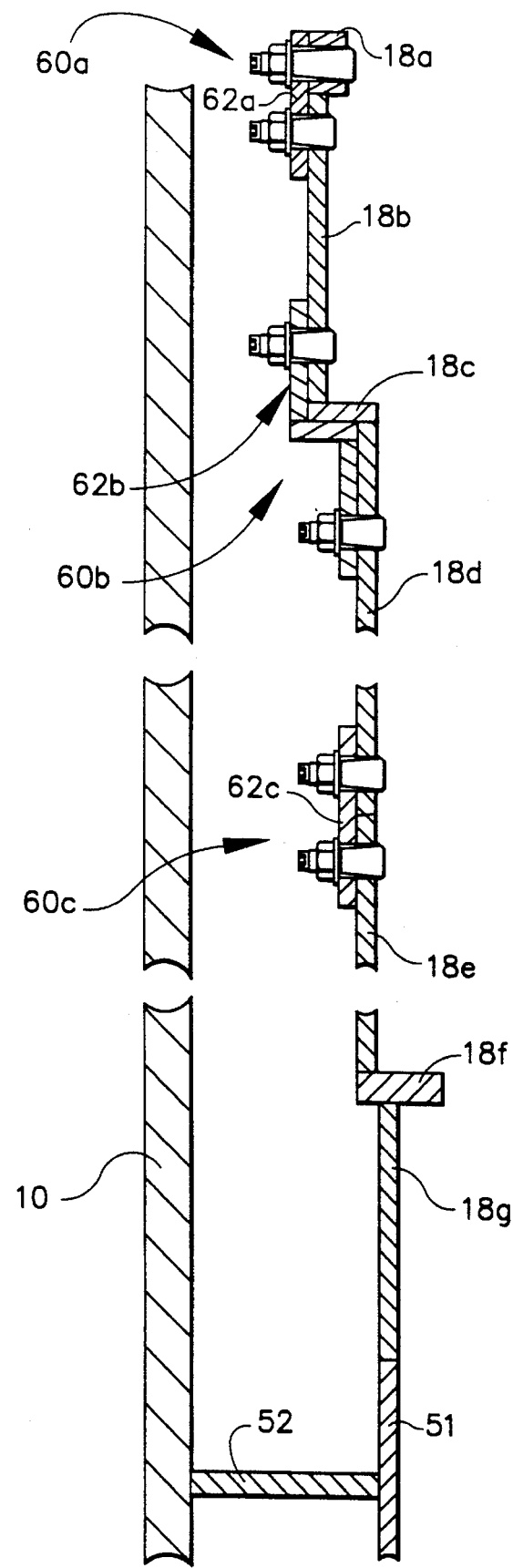
FIG. 2 is a sectional view of a portion of the core shroud of the BWR shown in FIG. 1 with installed shroud repair bracket assemblies in accordance with a preferred embodiment of the invention.
Figure 3:
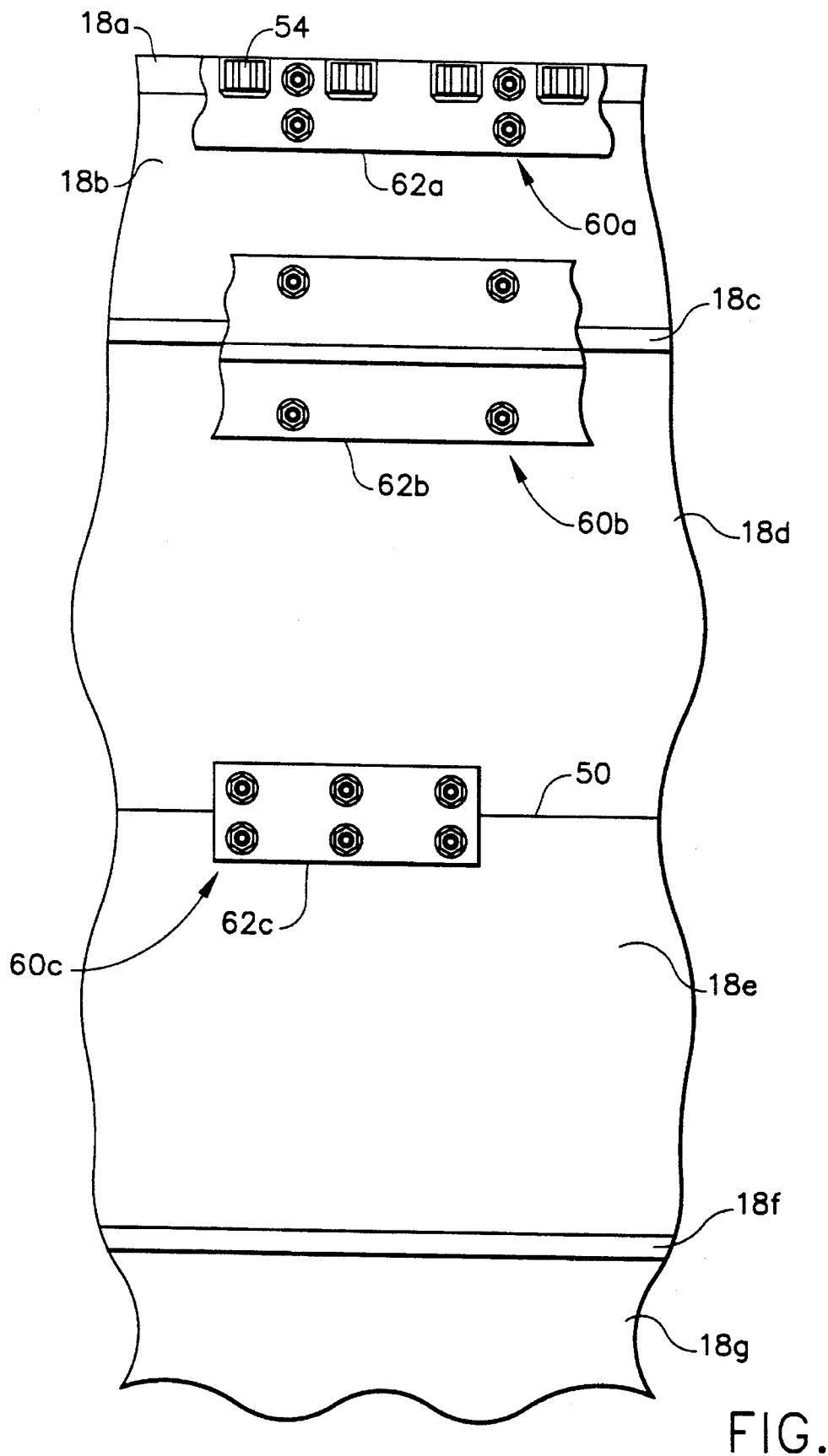
FIG. 3 is an azimuthal view of a portion of the core shroud showing brackets in accordance with the invention installed at three different elevations.

Each shroud repair bracket is fastened to the shroud above and below the crack elevation in a manner which will prevent relative movement across the shroud girth seam welds during all normal and upset conditions. As seen in FIGS. 2 and 3, in accordance with the repair technique of the present invention, a plurality of bracket assemblies 60a, 60b and 60c are installed at different elevations: one for reinforcing cracks in the welds joining shroud head flange 18a to upper shell section 18b; one for reinforcing cracks in the top guide support ring 18c; and one for reinforcing cracks in the core mid-plane weld 50.

Bracket assembly 60a has a bracket 62a for splicing shroud head flange 18a to upper shell section 18b when cracking occurs in the girth welds joining those sections. Preferably, bracket 62a is a curved plate having a radius of curvature approximately equal to the outer radius of upper shell section 18b. As seen in FIG. 3, bracket 62a is provided with a notch for each shroud head bolt lug 54 to be circumvented. Bracket 62a is fastened to upper shell section 18b by two tapered pins 66 and to shroud head flange 18a by two tapered pins 66', pins 66' being longer than pins 66.

Bracket assembly 60b has a bracket 62b for splicing upper shell section 18b to top section 18d of the mid-core shell section when the top guide support ring is cracked. Preferably, bracket 62b is a welded assembly of curved plates, the upper curved plate having a radius of curvature approximately equal to the outer radius of upper shell section 18b and the lower curved plate having a radius of curvature approximately equal to the outer radius of top section 18d of the mid-core shell section. Bracket 62b is fastened to upper shell section 18b and to top section 18d of the mid-core shell section by respective pairs of tapered pins 66.

Finally, bracket assembly 60c has a bracket 62c for splicing top section 18d to bottom section 18e of the mid-core shell section when the core mid-plane girth weld is cracked. Preferably, bracket 62c is a curved plate having a radius of curvature approximately equal to the outer radius of the mid-core shell section. Bracket 62c is fastened to top section 18d and to bottom section 18e of the mid-core shell section by respective trios of tapered pins 66.

Figure 4:
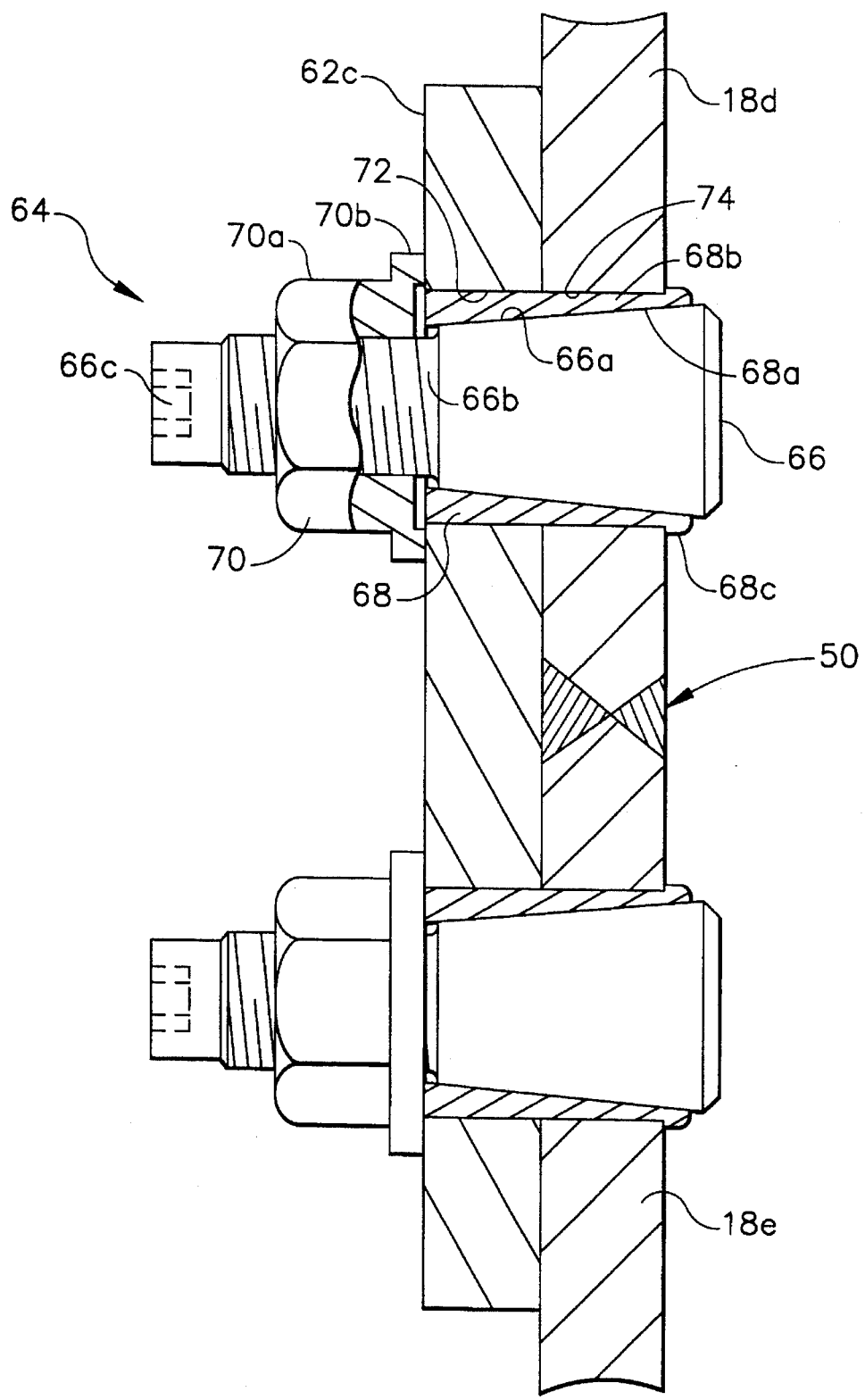
FIG. 4 is a sectional view of an installed shroud repair bracket assembly in accordance with the preferred embodiment of the invention.

In accordance with the preferred embodiment of the invention, each bracket is fastened to the shroud using tapered pin assemblies 64 which couple with aligned holes in the bracket and shroud. As seen in FIG. 4, the holes 72 in the bracket and holes 74 in the shroud wall are circular cylindrical and of equal diameter. Holes 74 are remotely machined in the shroud wall by a conventional electric discharge or other suitable machining technique.

FIG. 4 shows bracket 62c fastened to the top and bottom sections 18d and 18e of the mid-core shell section by tapered pin assemblies 64 in accordance with the preferred embodiment of the invention. Each tapered pin assembly comprises a threaded tapered pin 66, a slotted sleeve 68 and a threaded nut 70. The tapered pin has threaded portion 66b and a socket 66c on one end and an external conical, i.e., tapered, surface 66a on the other end. Each tapered pin 66 is held inside the holes 72, 74 by slotted sleeve 68 and threaded nut 70.

Figure 5:
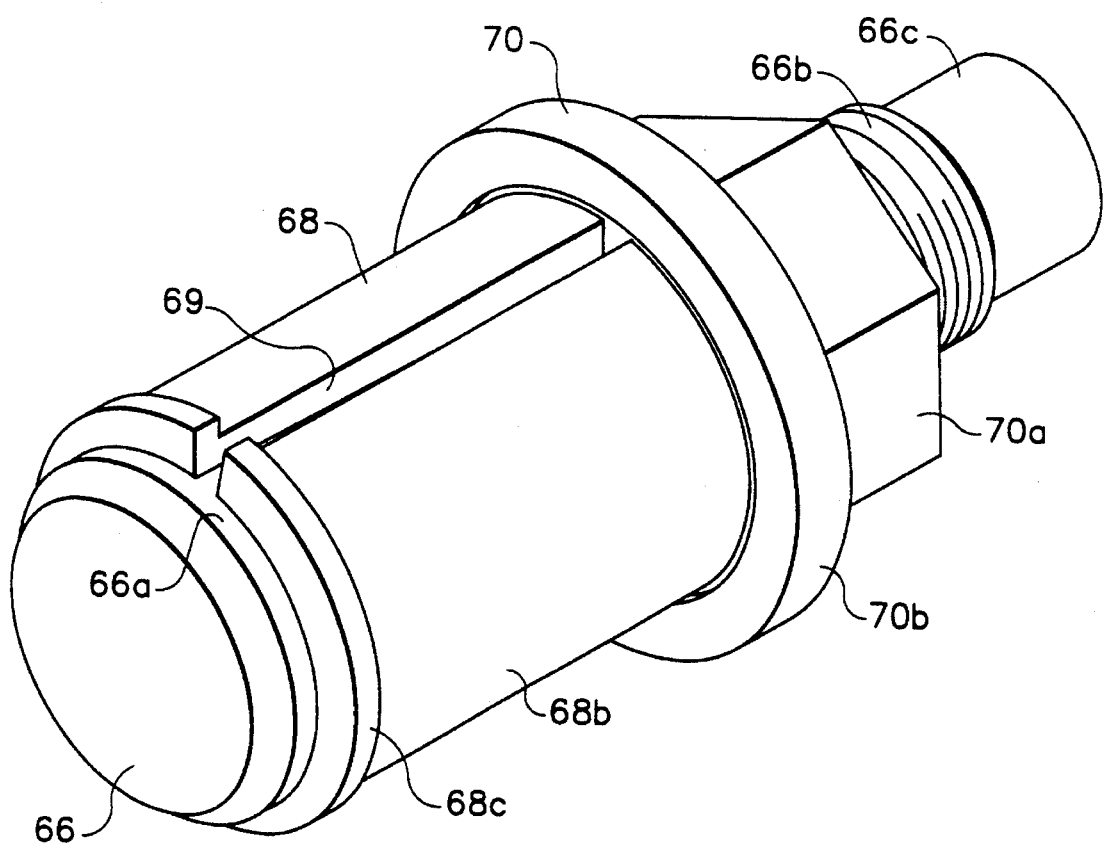
FIG. 5 is an isometric view of a tapered pin assembly having a slotted sleeve in accordance with the preferred embodiment of the invention.

When fully installed, the tapered portion of pin 66 is encased by slotted sleeve 68. The sleeve, shown in detail in FIG. 5, has a longitudinal slot 69 which allows the sleeve to be flexed radially outward into a configuration having an expanded diameter. The flexed sleeve 68 has an internal conical surface 68a which matches the external conical surface 66a of pin 66; an external surface 68b having a radius of curvature which matches the radius of curvature of hole 72 in the bracket and hole 74 in the shroud; and a raised flange 68c to act as an axial position stop.

The tapered pin assemblies in accordance with the invention can be entirely inserted from one side of the shroud. Prior to insertion, the unflexed sleeve 68 is slided onto the tapered pin 66 and then the nut 70 is threaded onto the pin for a number of turns sufficient to hold the unflexed sleeve 68 in place. At this stage, the diameter of annular flange 68c is less than the diameter of the holes 72, 74 in the bracket and shroud wall, allowing the sleeve 68 to pass through the holes. The assembly is then pushed through the aligned holes in the bracket and shroud wall until the nut 70 abuts the bracket 62c. Once the raised flange 68c of the sleeve 68 clears the inner edge of hole 74 in the shroud wall 18d, nut 70 is tightened to pull tapered pin 66 back until the assembly is seated, i.e., the annular flange 68c on the sleeve latches behind the shroud wall. During this operation, the sleeve is held in place initially by a thrust plate on the tool (not shown), reacting between the nut and the sleeve, and then after some expansion, by the raised flange bearing against the inner circumferential surface of the shroud wall. Higher axial load is then applied with a tensioner. This applies a contact pressure between the pins, sleeve, bracket and shroud.

The nut 70 has internal threads which engage the external threads on the threaded portion 66b of pin 66. During installation of the tapered pin assembly 64, a tool is inserted into socket 66c of pin 66 to prevent pin rotation. A tool with a hexagonal socket is coupled to the hexagonal head 70a of nut 70 and used to remotely tighten nut 70. Nut 70 further comprises a built-in washer 70b which has a circumferential flange of radius greater than the radius of hole 72. Thus, when nut 70 is tightened, the flange of washer 70b bears against the bracket 62c on the perimeter of hole 72, not against the end of the sleeve.

The outwardly flexed sleeve 68 has an outer circular cylindrical surface 68b of radius equal to the radius of circular holes 72 and 74. The tapered portion 66a of pin 66 applies increasing pressure on sleeve 68 during pin tensioning. When pin 66 is tensioned to the desired amount, nut 70 is tack-welded to the threaded portion 66b of pin 66 to lock the assembly in place. The tensioned pin assembly exerts a radially outwardly directed contact pressure on the cylindrical surfaces of the aligned circular holes 72, 74 respectively formed in the bracket and shroud, to hold the assembly securely in place.

A stud tensioning device can be used to apply large contact pressures, which result in a large friction force which will react loads axial to the pin assembly. Alternatively, where blind installation is not required, the sleeve flange and the head of the tapered pin could be large so that the required preload is small.

The contact pressure against the core shroud causes tensile stresses in the shroud, which could be of concern in highly irradiated steel. This concern can be mitigated by applying a noble metal (e.g., platinum or palladium) coating to the pin assembly or by alloying appropriate noble metals with the pin assembly materials. The noble metal will catalyze the recombination of water, thereby reducing the susceptibility of the shroud material to stress corrosion cracking.

In accordance with an alternative embodiment, the slotted sleeve can be replaced by a plurality of tapered sleeve segments. The angle of the tapered sleeve segments is dependent on their number. For example, if there are two sleeve segments, then each one covers slightly less than 180°. If there are three sleeve segments, then each one covers slightly less than 120°. Each sleeve segment has a precise internal taper which matches the external conical taper of the pin; an external surface having a radius of curvature which matches the radius of curvature of the holes in the shroud and in the repair bracket; and a raised flange to act as an axial position stop. The use of a plurality of sleeve segments, unlike the slotted sleeve, requires employment of a special tool to hold the sleeve segments in place during installation of the tapered pin assemblies.

A bracket suitable for repairing the shroud at a location where no change in diameter occurs, such as the shroud portion shown in FIG. 4, could be a piece of plate which is curved to conform to the shroud. If the repair is needed at a location where a change in shroud diameter occurs, e.g., at the top guide support ring 18c or at the core plate support ring 18f, the bracket could be a casting, forging or welded plate assembly (such as assembly 62b in FIG. 2). The thickness of the bracket assembly is selected based on the available space and the structural requirements. The preferred thickness is in the range of 1 to 3 inches. The number and location of the tapered pins is selected based on the maximum structural loads that must be carried by the repair brackets. The primary structural loads are due to postulated seismic events. The preferred configuration is four pins per bracket. However, six, eight, twelve or more pins could be used. The size of the bracket in the circumferential direction is determined based on the space available. The preferred width is approximately 3 to 5 feet. The height of the brackets is approximately 1 to 5 feet. Each pin assembly has an outside diameter of between 2 and 5 inches.

The preferred embodiment of the shroud repair bracket in accordance with the present invention has been disclosed for the purpose of illustration. Variations and modifications of the disclosed structure which do not depart from the concept of this invention will be readily apparent to mechanical engineers skilled in the art of tooling. For example, the number of sleeve segments may be two or more, so long as the sum of the angles is less than 360° by an amount which allows the sleeve segments to pass through the holes in the bracket and shroud wall when the sleeve segments are in contact with the backed-off nut. Further, the brackets may be provided with raised bearing pads which extend around the periphery of holes 72. These pads allow local machining to precisely match the contact surface of the bracket to the curved external surface of the shroud wall. Also, the socket on the end of the tapered pin can be replaced by a slot. All such variations and modifications are intended to be encompassed by the claims set forth hereinafter.

We claim:

1. A method for repairing a reactor core shroud having a circumferential crack at a predetermined elevation, comprising the steps of:

forming a curved bracket with first and second circular holes;

machining a first circular hole in a first shroud section located at an elevation higher than said predetermined elevation, said first circular hole being located to align with said first circular hole formed in said bracket when said bracket is placed in a predetermined position relative to said shroud;

machining a second circular hole in a second shroud section located at an elevation lower than said predetermined elevation, said second circular hole being located to align with said second circular hole formed in said bracket when said bracket is in said predetermined position;

placing said bracket in said predetermined position outside said shroud with said respective first and second circular holes in alignment;

blindly installing first and second pin assemblies into said respective first and second circular holes of said bracket and said shroud by remote manipulation.

2. The method as defined in claim 1, wherein said blind installation comprises the steps of:

inserting first and second pin assemblies into said respective first and second circular holes of said bracket and thereafter into said respective first and second circular holes of said shroud, leaving a portion of said first and second pin assemblies protruding outside said shroud; and remotely manipulating each of said portions of said first and second pin assemblies protruding outside said shroud to securely fasten said bracket to said shroud.

3. The method as defined in claim 2, wherein each of said remotely manipulated first and second pin assemblies is tensioned to exert a radially outwardly directed contact load on the cylindrical surface of said first and second circular holes respectively formed in said shroud.

* * * * *